United States Patent [19]

Lindblad

[11] Patent Number: 5,114,090
[45] Date of Patent: May 19, 1992

[54] SAFETY BELT ARRANGEMENT

[75] Inventor: Hans P. Lindblad, Alingsas, Sweden

[73] Assignee: Autoliv Development AB, Vargarda, Sweden

[21] Appl. No.: 402,845

[22] Filed: Sep. 6, 1989

[30] Foreign Application Priority Data

Sep. 7, 1988 [GB] United Kingdom ................ 8820936

[51] Int. Cl.⁵ .................... B60R 22/46; B60R 21/10; B65H 75/48
[52] U.S. Cl. ............... 242/107; 242/107.4 R; 280/806
[58] Field of Search ......... 242/107, 107.4 R, 107.4 A, 242/107.4 B; 280/806; 297/478; 192/53 H, 43.1, 8 A, 8 C, 17 D, 17 R, 11

[56] References Cited

U.S. PATENT DOCUMENTS

| | | | |
|---|---|---|---|
| 3,004,646 | 10/1961 | Seiden | 192/17 D |
| 3,982,616 | 9/1976 | Bidamset | 192/17 D |
| 4,423,846 | 1/1984 | Föhl | 242/107 |
| 4,445,648 | 5/1984 | Bloch | 280/806 X |
| 4,455,000 | 6/1984 | Nilsson | 242/107 |
| 4,558,832 | 12/1985 | Nilsson | 242/107 |
| 4,618,108 | 10/1986 | Butenop et al. | 242/107 |
| 4,907,820 | 3/1990 | Fohl | 280/806 |
| 4,925,123 | 5/1990 | Frei et al. | 242/107 |

FOREIGN PATENT DOCUMENTS

| | | |
|---|---|---|
| 0093233 | 2/1983 | European Pat. Off. . |
| 0321960 | 6/1989 | European Pat. Off. . |
| 3231509 | 3/1984 | Fed. Rep. of Germany ... 242/107.4 R |
| 3329687 | 3/1985 | Fed. Rep. of Germany ... 242/107.4 R |
| 3400177 | 7/1985 | Fed. Rep. of Germany . |
| 3430871 | 5/1986 | Fed. Rep. of Germany ...... 280/806 |
| 3531856 | 12/1986 | Fed. Rep. of Germany . |
| 2180734 | 4/1987 | United Kingdom . |

Primary Examiner—Stuart S. Levy
Assistant Examiner—Joseph A. Rhoa
Attorney, Agent, or Firm—Spencer, Frank & Scneider

[57] ABSTRACT

In a safety belt arrangement a pre-tensioner assembly is provided adapted to apply tension to a cable. The cable is wound directly round the outer periphery of a plurality of pivotally mounted shoes which, in response to tension being applied to the cable, move to a position in which they engage an extension of the shaft of a retractor reel. Continuing tension applied to the cable causes the shoes and the shaft to rotate about the axis of the shaft.

10 Claims, 4 Drawing Sheets

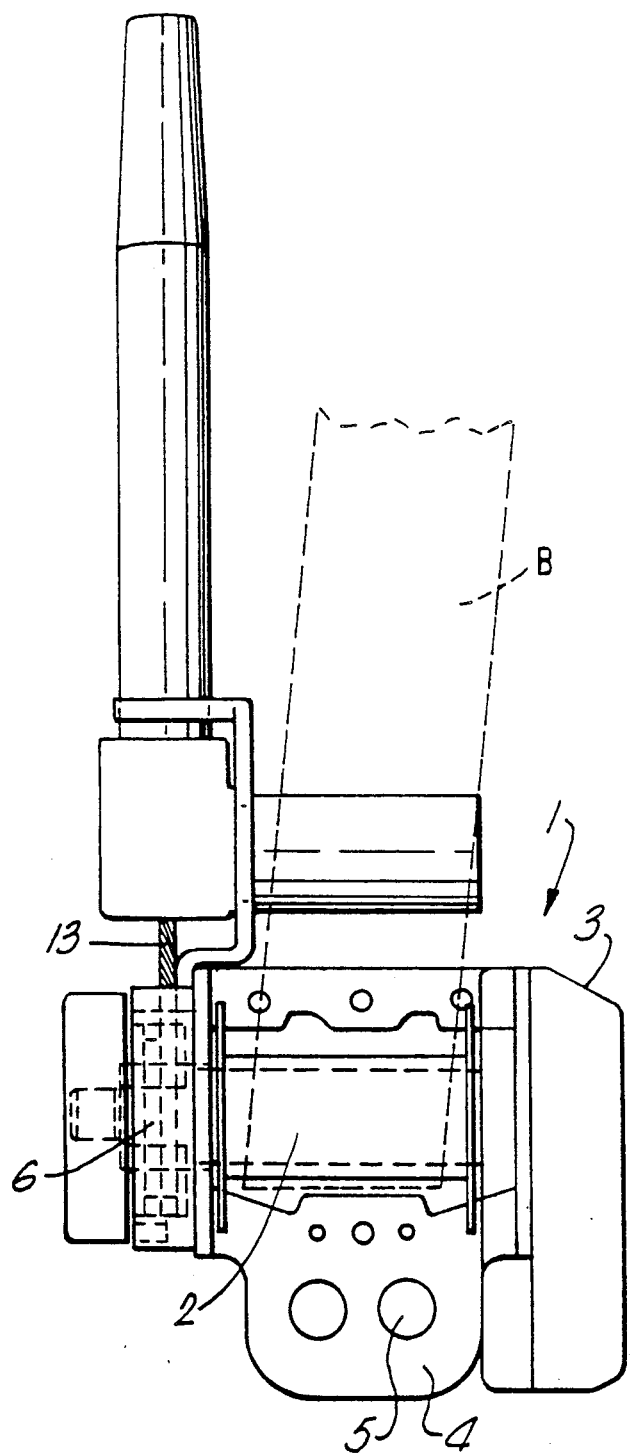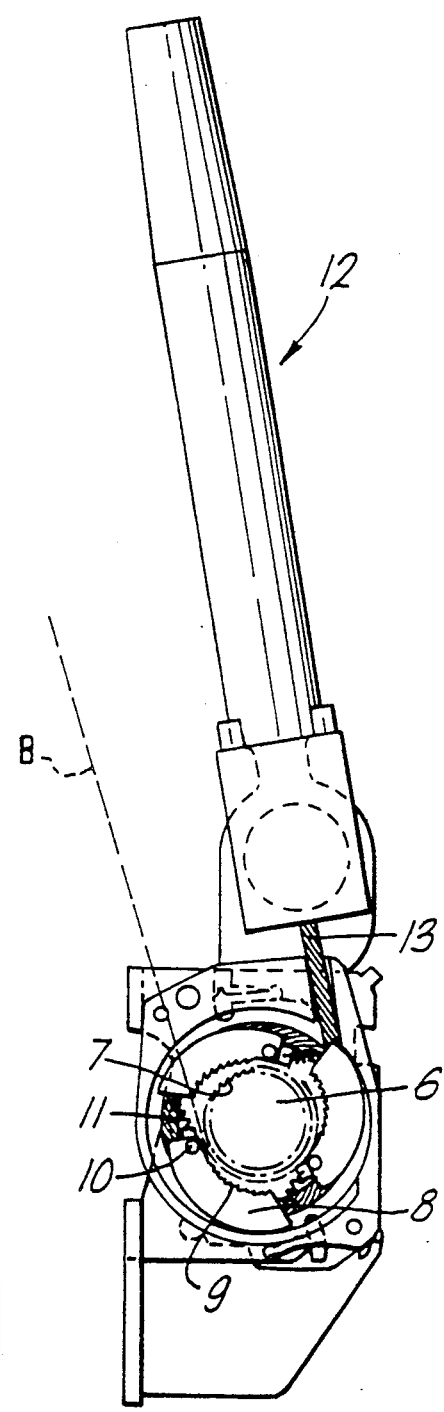

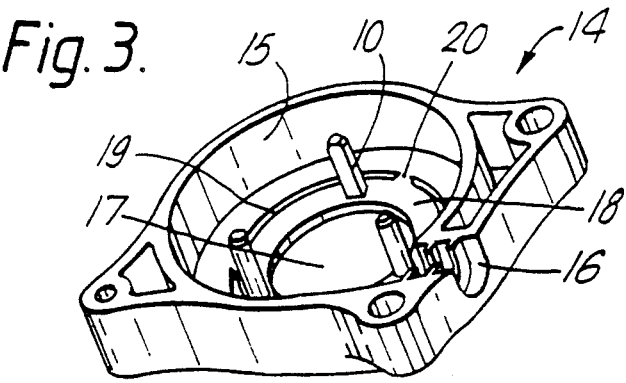
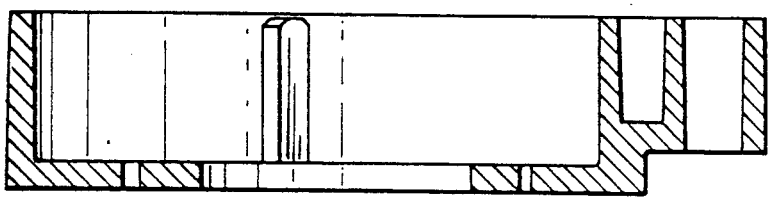
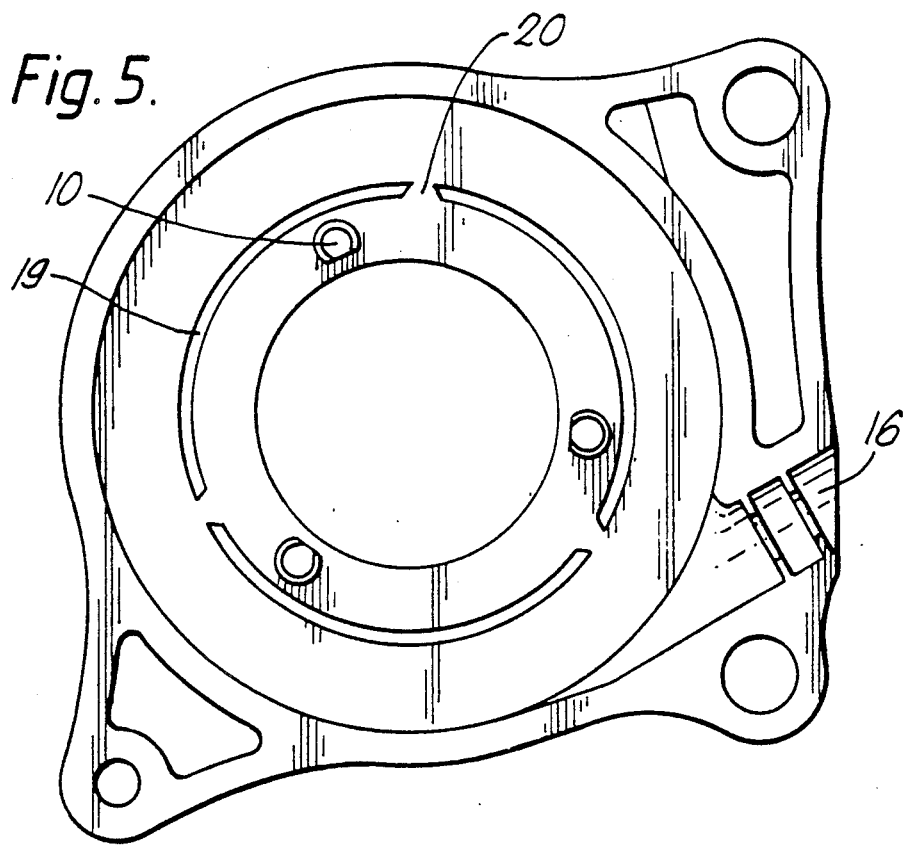

SAFETY BELT ARRANGEMENT

BACKGROUND TO THE INVENTION

The present invention relates to a safety belt arrangement and more particularly to a safety belt arrangement for use in restraining a passenger in a motor vehicle, such as a motor car.

It has been proposed to provide safety belts to restrain passengers within motor vehicles, such as motor cars. Conventionally such safety belts are associated with retractor reels which serve to retract the belt and maintain a slight tension in the belt. The retractor reel usually incorporates a locking mechanism which locks the reel to prevent belt being paid out from the reel in the event that an accident arises. Such a locking mechanism may respond either to severe deceleration of the vehicle, and/or to belt being withdrawn from the reel at greater than a predetermined rate.

It has been found desirable to provide, in association with such safety belts, a pre-tensioner adapted to apply a tension to the belt, in the event that an accident situation should arise. Since the locking arrangement present in a conventional retractor reel takes some time to be actuated, it is often the case that a certain length of safety belt has been paid out, from the reel, before the locking mechanism serves to lock the reel. The length of safety belt that has been paid out may be sufficient to permit the passenger restrained by the safety belt to travel forwardly, relative to his seat, which means that the passenger may then be in a position where he can hit the windscreen of the motor vehicle with his head. However, if a pre-tensioner is provided, when an accident situation is sensed, a tension is applied to the safety belt which serves to prevent this happening, retaining the passenger firmly in his seat.

Various types of pre-tensioner have been proposed before, and certain pre-tensioners have been proposed which serve to rotate the shaft of the retractor reel in order to wind a length of safety belt on to the reel when an accident situation arises.

U.S. Pat. No. 4,423,846A discloses a pre-tensioner of this type. When an accident situation is sensed a force is applied to a cable which is applied to a drum. The drum is provided with elements which, on rotation of the drum, engage fixed pegs and are thus moved to a condition where they engage a splined extension of the shaft of the retractor reel. Continued tension applied by the cable causes the shaft of the retractor reel to rotate, winding safety belt on to the shaft of the retractor reel. However, this movement of the drum also snaps the pegs. Thus if the elements become disengaged from the splined extension of the shaft there is nothing to reengage them with the shaft. The described arrangement is relatively complex and difficult to assemble.

OBJECT OF THE INVENTION

The present invention seeks to provide an improved safety belt arrangement incorporating a pre-tensioner adapted to rotate the shaft of a retractor reel.

SUMMARY OF THE INVENTION

According to this invention there is provided a safety belt arrangement comprising a safety belt mounted on a shaft of a retractor reel adapted to retract part of the safety belt, a pre-tensioner assembly adapted to apply tension to a cable or the like, the cable being wound round a mechanism incorporating a plurality of elements which are mounted for pivotal movement in response to tension being applied to the cable from an initial position in which the elements are spaced from an extension of the shaft of the retractor reel to an engagement position in which the elements engage the extension of the shaft of the retractor reel, continuing tension applied to the cable causing the elements and the shaft to rotate about the axis of the shaft, means being provided to retain the elements in the initial position, wherein the elements comprise shoes pivotally mounted for rotation about pivot pins, the cable or the like being wound round the outer periphery of the shoes so that the shoes pivot radially inwardly to engage the shaft extension in response to a radially inwardly acting force applied to the shoes by the cable when said tension is applied to the cable.

Since the cable acts directly on the shoes, there is no need to provide the drum or the fixed pegs present in the prior art arrangement. Also, it will be appreciated, that the cable will keep the shoes in engagement with the extension of the shaft for as long as tension is applied to the cable. Thus there is no risk of the shoes becoming disengaged from the extension of the shaft inadvertently.

Preferably the said means to retain the shoes in the first condition comprise resilient means, such as springs. The springs may be separate discrete springs, or may be formed integrally with the shoes.

Preferably the shoes are pivotally mounted, each shoe being of generally arcuate form and being pivotally mounted adjacent one end thereof.

Conveniently the shoes are pivotally mounted at their trailing edges considered in the sense of the direction of rotation of the shoes when tension is applied to said cable or the like.

Advantageously the shoes are pivotally mounted on pivot pins which have axes extending parallel with the axis of the shaft of the retractor reel, the pivot pins being mounted on a ring-shaped element, means being provided initially to retain the ring-shaped element in a predetermined position.

Preferably said means to retain the ring-shaped element in a predetermined position comprise narrow necks of material joining the ring-shaped element to a further part of the structure of the safety belt arrangement, the necks of material being frangible.

Conveniently the inner surface of each shoe is roughened, and the outer surface of the extension of the shaft of the retractor reel is similarly roughened.

Preferably a plurality of shoes are provided, the shoes being formed as an integral moulding of a plastics material.

Conveniently the shoes are integrally moulded with interconnecting webs which constitute resilient means which retain the shoes in said initial condition.

Alternatively the shoes are integrally moulded of a plastics material, the shoes being interconnected by frangible webs which constitute the means to retain the shoes at the initial position.

Preferably auxilliary spring means are provided in the form of a metal washer provided with axially extending resilient arms which engage said shoes to bias the shoes towards the initial position.

BRIEF DESCRIPTION OF THE DRAWINGS

In order that the invention may be more readily understood, and so that further features thereof may be appreciated, the invention will now be described, by way of example, with reference to the accompanying drawings in which FIG. 1 is a front view of a safety belt apparatus in accordance with the present invention, FIG. 2 is a side view of the apparatus shown in FIG. 1 with parts removed for the sake of clarity of illustration, FIG. 3 is a perspective view of a modified housing forming part of the apparatus similar to that illustrated in FIGS. 1 and 2, FIG. 4 is a cross-sectional view of the housing of FIG. 3, FIG. 5 is a front elevational view of the housing of FIG. 3.

DESCRIPTION OF THE PREFERRED EMBODIMENTS

Figure 6:
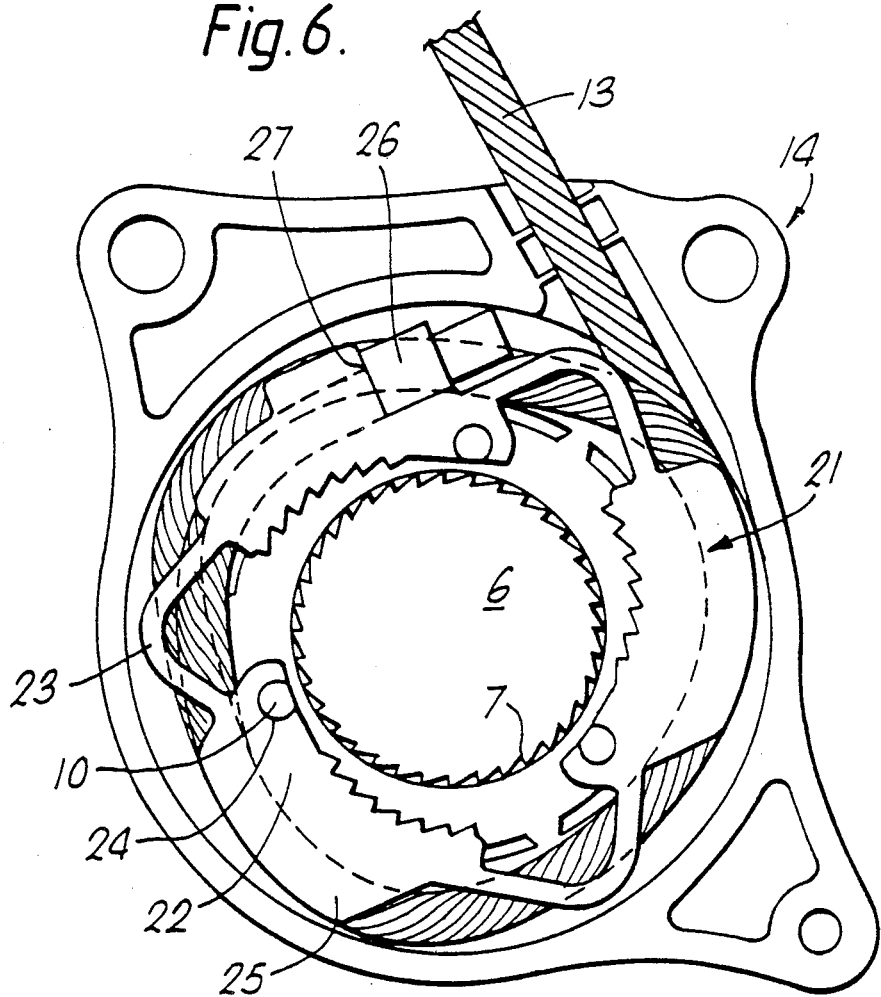
FIG. 6 is a plan view illustrating a modified embodiment of the invention, the modified embodiment incorporating the housing of FIG. 5.

Referring initially to FIGS. 1 and 2 of the accompanying drawings, a safety belt arrangement in accordance with the present invention comprises a conventional retractor reel assembly 1 which incorporates a shaft portion 2 on which a safety belt B may be wound, and which also incorporates a cover 3 covering a locking mechanism for locking the shaft 2 under predetermined accident conditions. The retractor reel assembly is provided with a mounting plate 4 provided with apertures 5 to receive mounting bolts. The rectangular reel assembly also incorporates a spring to apply a rotational force to the shaft 2. As thus far described the retractor reel assembly may be of conventional design.

One end of the shaft 2 is extended to form an extension 6. The extension 6 is provided with a roughened outer surface 7 which may be constituted by milling or splines. Three arcuate shoes 8 are provided which are mounted adjacent the extension 6 of the shaft 2. The shoes are of arcuate form, and the radially inner surface 9 of each shoe is roughened, for example milled or grooved to engage with the roughened surface 7 provided on the extension 6. Each shoe 8 is pivotally mounted for rotation about a pivot pin 10. The axes of the pivot pins 10 are parallel with the axis of the shaft 2. Each pivot pin 10 is located adjacent one end of the respective shoe 8. The shoes are biassed, by means of resilient biassing means constituted by springs 11, to positions, in which the inner surfaces 9 of the shoes 8 are spaced from the outer surface 7 of the extension 6 of the shaft 2.

The pivot pins 10 are formed on a ring-shaped element which is obscured in FIG. 2 by the shoes. The ring-shaped element is secured to the adjacent part of the retractor reel assembly 1 by means of shearable pins or the like.

A pre-tensioner 12 is provided which may comprise a mechanical device or a pyrotechnic device. The pre-tensioner is adapted, when activated, to apply tension to a cable or like member 13, serving to withdraw the cable 13 into the pre-tensioner assembly 12. The cable 13 is wrapped, with several turns, around the exterior of the three shoes 8, and the free end of the cable is connected to one of the shoes.

In operation of the device, the shoes are in an initial position in which they do not engage the extension 6. When a tension is applied to the cable 13, initially the tension in the cable serves to cause each shoe 8 to pivot about the respective pivot pin 10, against the bias provided by the springs 11, so that the inner surface 9 of each shoe is brought into firm non-slipping engagement with the outer surface 7 of the extension 6 of the shaft 2. The shoes are thus in an engaging position. Further tension causes the shearable pins associated with the ring supporting the pivot pins 10 to break, enabling the ring on which the pivot pins 10 are mounted to rotate in an anti-clockwise direction, as seen in FIG. 2. This serves to rotate the shaft 2 in an anti-clockwise direction, winding on to the shaft a length of safety belt B. Thus the safety belt B is pre-tensioned. When the pre-tensioner 12 has ceased operation, the cable 13 may be released, and the springs 11 serve to bias the shoes 8 outwardly, thus releasing the shoes from the extension 6 of the shaft 2. The retractor reel assembly 1 is then free to operate in its normal way.

It is to be noted that the shoes 8 are each pivotally mounted about pivot axes 10 located adjacent the trailing edges of the shoes, when considered in the direction in which the shoes rotate when tension is applied to the cable 13. The cable effectively passes from the trailing edge to the leading edge of each shoe. It is thought that this helps ensure that the shoes move rapidly to the engaging position when tension is applied to the cable 13.

The shoes 8 may be formed of any suitable material, and may thus be formed of metal or may be formed of plastics material.

FIGS. 3 to 5 illustrate a housing 14 which is used in a modified embodiment of the invention and which incorporates the pivot pins 10 upon which the shoes 8 as described above may be mounted.

The housing 14 may be injection moulded or die cast from any suitable material such as metal or plastics. The housing incorporates a central circular chamber 15, and a guide channel 16 through which the cable 13 may enter the chamber 15. The chamber 15 is dimensioned to receive the extension 6 of the shaft 2 together with the shoes 8 and the associated springs 11.

The base of the chamber 15 is provided with a central aperture 17 through which part of the shaft 2 may pass.

It is to be noted that the pivot pins 10 are mounted on an annular portion 18 of the base of the chamber 15, which is separated from the rest of the base by a plurality of arcuate slots 19 so that the annular portion 18 is only connected to the rest of the base by three relatively narrow necks of material 20. It is thus to be understood that in normal circumstances the pivot pins 10 are fixed in position. Consequently, in normal circumstances, the shoes 8 are not free to rotate about the axis of the shaft 2. However, when a tension is applied to the cable 13, initially that tension serves to move the leading edges of the shoes 8 pivotally inwardly until the inner surfaces 9 of the shoes engage the outer surface 7 of the extension 6 of the shaft 2, and further tension applied to the cable 13 causes the narrow necks 20 of material to break, thus enabling the annular element 18, carrying the pivot pins 10, to rotate about the axis of the shaft 2, thus causing the shaft 2 to rotate, as described above.

In the embodiments of the invention thus far described three separate shoes 8 and three separate springs 11 are utilised. FIG. 6, however, illustrates a modified embodiment of the invention in which an integral shoe and spring assembly 21 is provided, which is illustrated as being mounted in a housing 14 as described above.

The shoe and spring assembly 21 is formed as an integral moulding of a plastics material. The moulding defines three shoe portions 22 which are interconnected by relatively narrow webs 23 which comprise biassing springs, which function in the same way as the springs 11. The shoe portions each define an aperture or recess 24 adapted to pivotally engage a pivot pin 10. The shoe portions are each pivotally mounted adjacent their trailing edge. As can be seen in FIG. 6 the cable 13 from the pre-tensioner passes, with several turns, around the outsides of the shoes, the cable being received in grooves 25 defined in the rear surfaces of the shoes. The free end of the cable is provided with an enlargement or stop 26 which engages an abutment face 27 defined on the appropriate shoe portion.

It will be appreciated that the embodiment described in FIG. 6 operates in the same way as the embodiment described primarily with reference to FIGS. 1 and 2, but instead of having three separate shoes and three separate springs, a single element comprises both the shoes and the springs. Thus manufacture and assembly may be greatly facilitated.

Figure 8:
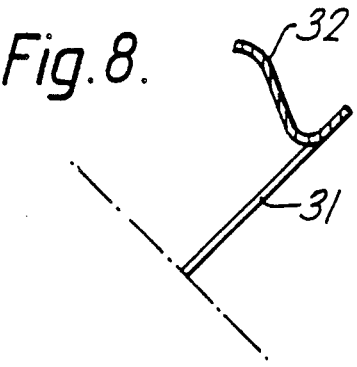
FIG. 8 is a sectional view of part of a spring element incorporated in the embodiment of FIG. 7, and FIGS. 9A and 9B illustrate a further possible structure for the shoes.
Figure 7:
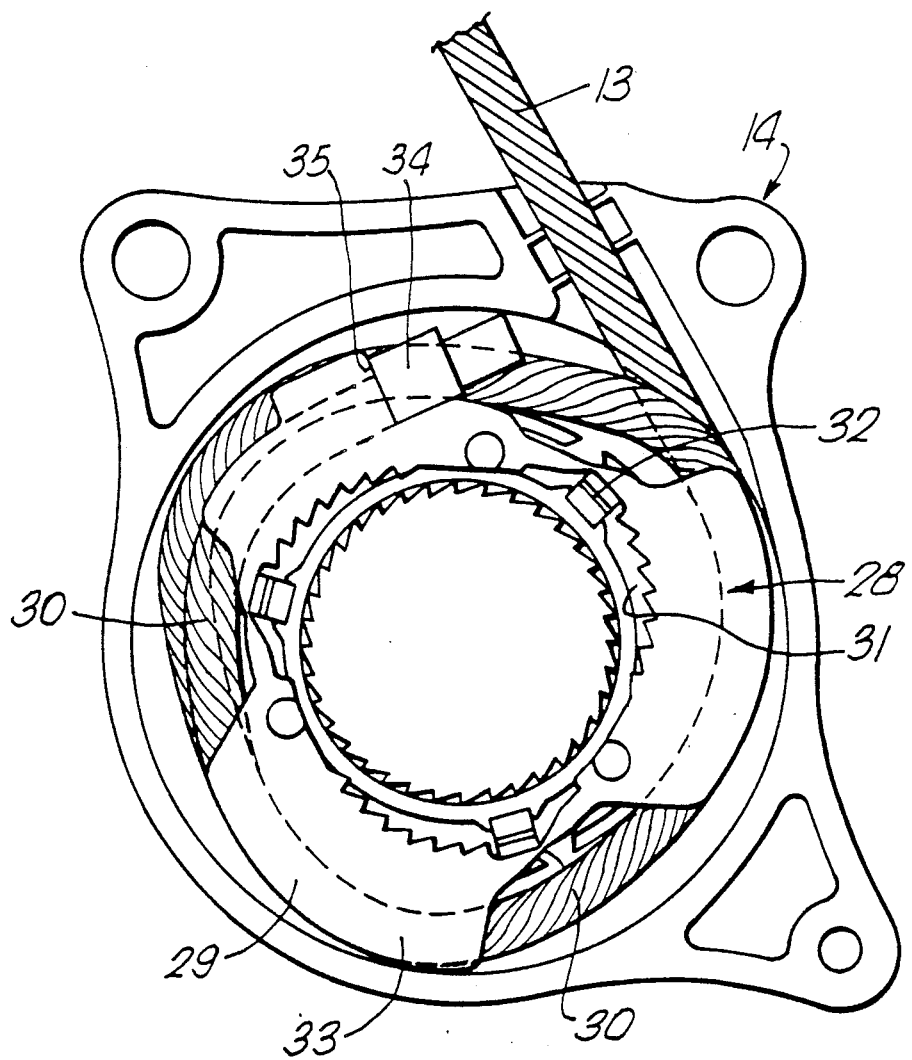
FIG. 7 is a further plan view of a further modified embodiment of the invention, again incorporating the housing of FIG. 5.

FIG. 7 illustrates another embodiment of the invention, but again this embodiment incorporates a housing 14 as described above. Again this embodiment incorporates an integrally formed shoe assembly 28. The shoe assembly 28 consists of three shoe elements 29, which are formed as an integral moulding of a plastics material, but the shoe elements 29 are interconnected by relatively thin interconnecting webs 30 which are adapted to break if the shoes move relative to one another. The webs serve to prevent the shoes moving prematurely to the engaging position, for example when the motor vehicle travels over a rough surface. Mounted adjacent the shoes is a washer 31 formed of a metal which is provided with substantially axially extending resilient arms 32 which engage portions of the shoes to effect a resilient outward bias. FIG. 8 is a sectional view through part of the washer, showing a peripheral portion of the washer 31 and the axially extending resilient arm 32. In this embodiment the cable 13 passes through grooves 33 formed in the exterior of each shoe, and the cable is terminated with an enlargement or termination 34 which abuts against an abutment surface 35 defined on the appropriate shoe. This embodiment of the invention is to be preferred to the embodiment illustrated in FIG. 6 where the reel is to be submitted to extremes of temperature, since in extreme temperatures a spring formed of a web of plastics material (such as the web 23) may not function properly. A spring such as provided by a metal washer 31 provided with extending resilient arms 32 provides more uniform properties over a wide range of temperatures.

Figure 9A:
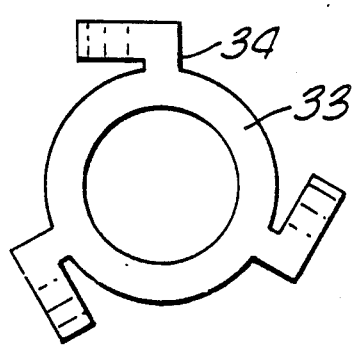
Figure 9B:
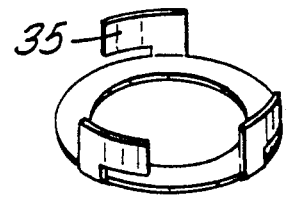

FIGS. 9A and 9B show another possible structure for the shoes. A ring-shaped element 33 formed of a sheet material has three outwardly extending arms 34 as shown in FIG. 9A. The arms may be bent to extend out of the plane of the ring as shown in FIG. 9B. The arms then form pivots. As shown the free ends of the arms carry projections 35, which may be corrugated, which can then act as shoes in the manner described above.

Whilst the invention has been described with reference to specific examples it is to be appreciated that many modifications may be effected without departing from the scope of the invention as defined by the following claims.

What is claimed is:

1. A safety belt arrangement, comprising a safety belt mounted on a shaft of a retractor reel adapted to retract part of the safety belt, a pre-tensioner assembly adapted to apply tension to a cable means for transmitting forces, the cable means being wound round a mechanism incorporating a plurality of elements which are mounted for pivotal movement in response to tension being applied to the cable means from an initial position in which the elements are spaced form an extension of the shaft of the retractor reel to an engagement position in which the elements engage the extension of the shaft of the retractor reel, continuing tension applied to the cable means causing the elements and the shaft to rotate about the axis of the shaft, means being provided to retain the elements in the initial position, wherein the elements comprise shoes pivotally mounted for rotation about pivot pins which have axes extending parallel with the axis of the shaft of the retractor reel, each shoe having a generally arcuate form with a trailing end, considered in the sense of rotation of the shoes when tension is applied to the cable means, and being pivotably mounted adjacent its trailing end by a respective pivot pin, the pivot pins being mounted on a ring-shaped element, shearable means being provided initially to retain the ring-shaped element in a predetermined position, the cable means being wound round and directly on the outer peripheries of the shoes so that the shoes pivot radially inwardly to engage the shaft extension in response to a radially inwardly acting force applied to the shoes by the cable means when said tension is applied to the cable means.

2. An arrangement according to claim 1 wherein the said means to retain the shoes in the first condition comprise springs.

3. An arrangement according to claim 2 wherein the springs are formed integrally with the shoes.

4. An arrangement according to claim 1 wherein said shearable means to retain the ring-shaped element in a predetermined position comprise narrow necks of material joining the ring-shaped element to a further part of the structure of the safety belt arrangement.

5. An arrangement according to claim 1 wherein the inner surface of each shoe is roughened, and the outer surface of the extension of the shaft of the retractor reel is similarly roughened.

6. An arrangement according to claim 1 wherein a plurality of shoes are provided, the shoes being formed as an integral moulding of a plastics material.

7. A safety belt arrangement, comprising a safety belt mounted on a shaft of a retractor reel adapted to retract part of the safety belt, a pre-tensioner assembly adapted to apply tension to a cable means for transmitting forces, the cable means being wound round a mechanism incorporating a plurality of elements which are mounted for pivotal movement in response to tension being applied to the cable means from an extension of he shaft of the retractor reel to an engagement position in which the elements engage the extension of the shaft of the retractor reel, continuing tension applied to the cable means causing the elements and the shaft to rotate about the axis of the shaft, means being provided to retain the elements in the initial position, wherein the elements comprise shoes pivotally mounted for rotation about pivot pins which have axes extending parallel with the axis of the shaft of the retractor reel, the pivot pins being mounted on a ring-shaped element, shearable means being provided initially to retain the ring-shaped element in a predetermined position, the cable means being wound round the outer peripheries of the shoes so that the shoes pivot radially inwardly to engage the shaft extension in response to a radially inwardly acting force applied to the shoes by the cable means when said tension is applied to the cable means, and wherein a plurality of shoes is provided, the shoes being formed as an integral molding of plastic material with interconnected webs which constitute resilient means which retain the shoes in said initial condition.

8. An arrangement according to claim 7 wherein the shoes are integrally moulded of a plastic material, the shoes being interconnected by frangible webs which constitute the means to retain the shoes at the initial position.

9. An arrangement according to claim 8 wherein auxiliary spring means are provided in the form of a metal washer provided with axially extending resilient arms which engage said shoes to bias the shoes toward the initial position.

10. A safety belt arrangement, comprising a safety belt mounted on a shaft of a retractor reel adapted to retract part of the safety belt, a pre-tensioner assembly adapted to apply tension to a cable means for transmitting forces, the cable means being wound round a mechanism incorporating a plurality of elements which are mounted for pivotal movement in response to tension being applied to the cable means from an initial position in which the elements are spaced from an extension of the shaft of the retractor reel to an engagement position in which the elements engage the extension of the shaft of the retractor reel, continuing tension applied to the cable means causing the elements and the shaft to rotate about the axis of the shaft, means being provided to retain the elements in the initial position, the extension of the shaft having a roughened outer periphery, wherein the elements comprise shoes pivotally mounted for rotation about pivot pins which have axes extending parallel with the axis of the shaft of the retractor eel, each shoe having an arcuate outer periphery and having an arcuate inner periphery that faces the outer periphery of the extension of the shaft, the inner peripheries of the shoes being roughened the pivot pins being mounted on a ring-shaped element, shearable means being provided initially to retain the ring-shaped element in a predetermined position, the cable means being wound round and directly on the outer peripheries of the shoes so that the shoes pivot radially inwardly and the arcuate inner peripheries of the shoes engage the shaft extension in response to a radially inwardly acting force applied to the shoes by the cable means when said tension is applied to the cable means.

* * * * *